Figure 1:
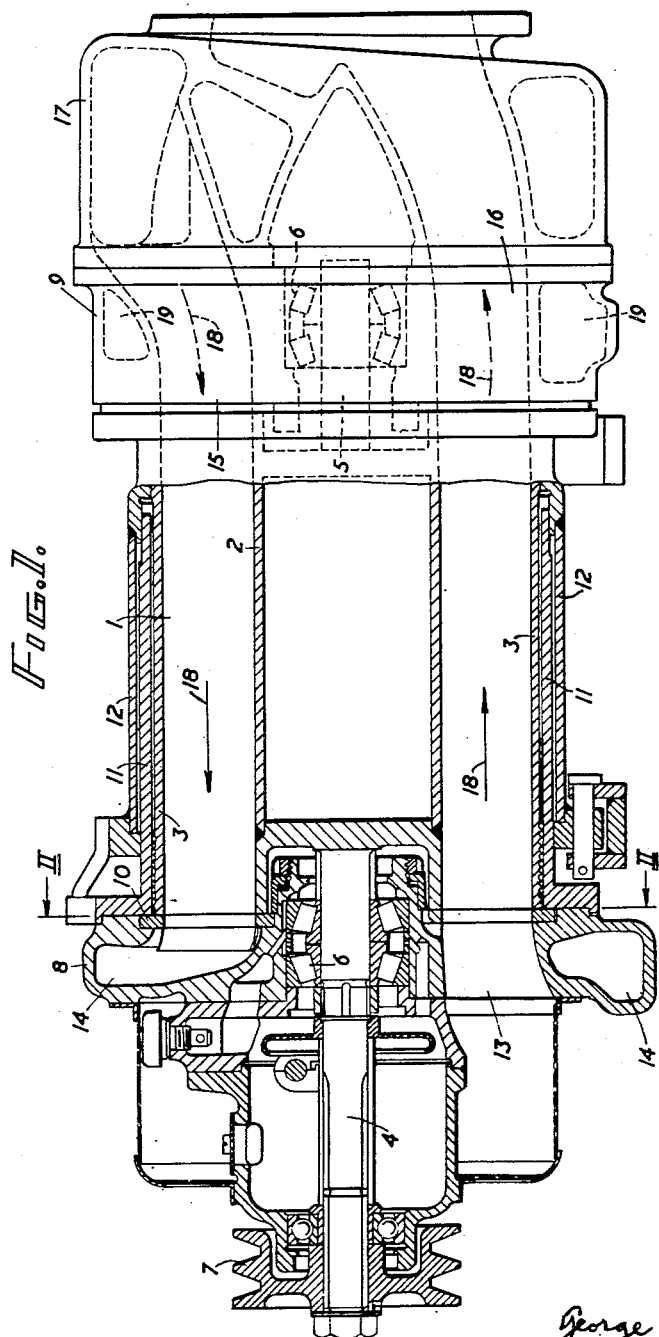

May 27, 1958 G. JENDRASSIK 2,836,346
PRESSURE EXCHANGERS
Filed June 15, 1956 5 Sheets-Sheet 1

May 27, 1958  G. JENDRASSIK  2,836,346
PRESSURE EXCHANGERS

Filed June 15, 1956  5 Sheets-Sheet 2

United States Patent Office 2,836,346
Patented May 27, 1958

2,836,346

PRESSURE EXCHANGERS

George Jendrassik, deceased, late of London, England, by Andre G. T. Boszormenyi and Clara Jendrassik, executors, London, England, assignors to Jendrassik Developments Limited, Mayfair, London, England Application June 15, 1956, Serial No. 591,761

Claims priority, application Great Britain June 17, 1955

12 Claims. (Cl. 230—69)

The invention relates to rotary pressure exchangers of the kind comprising a ring of cells for the compression and expansion of gas, ducting for leading gas to and from the cells (for example, at heat input and heat rejection stages) and means for effecting relative rotation between the cells and the ducting.

The invention is particularly concerned with pressure exchangers of the above kind which are employed to supply a consumer machine with gas at a high pressure or velocity. Such a pressure exchanger could be employed, for example, for supercharging an internal combustion engine.

Compression and expansion of gas in the cells of a pressure exchanger are normally produced by shock and rarefaction waves respectively set up in the cells due to the sudden opening or closing of the ends of the cells. The compression and expansion may be reinforced by the use of transfer passages interconnecting in pairs cells containing gas at different pressures. It is also possible to rely only on the pressure exchange effected by the transfer passages, but even then if the gas velocities are sufficiently high shock or rarefaction waves would be produced. A shock wave occurs when a cell is opened to a duct containing gas at a higher pressure than that in the cell and similarly a rarefaction occurs when a cell is opened to a duct containing gas at a lower pressure than that in the cell. Ideally the opening and closing of the ends of the cells are timed in such a manner that when a wave is set up at one edge of one end of a cell it travels to the other end which is closed, is reflected by the said other end and reaches the said first end just as that end is closed. It will be appreciated that this state of affairs depends upon factors which include the circumferential width of cell openings, the relative timing of opening and closing opposite ends of a cell, the speed of rotation of the cell ring relatively to the ducting, and the local speed of sound.

An object of the invention is to provide a pressure exchanger whose manner of operation may be adjusted to allow at least partly for fluctuations in certain of the above or other factors.

According to the invention a rotary pressure exchanger comprises a ring of cells for the compression and expansion of gas, ducting for leading gas to and from the cells, means for effecting relative rotation between the cells and the ducting, a ported annular plate positioned between the ducting and the cells at one end of the cells at least, said ported plate being movable circumferentially relatively to the ducting at the opposite end of the cells and means for circumferentially moving the ported plate.

The ported plate may be a control ring positioned between the cell ring and ends of the ducting adjacent an end of the cells, the control ring being adjustable circumferentially relatively to the ducting and having orifices therein which are so dimensioned and arranged in relation to the ducting ends that the latter are at least partly obscured by the control ring, and means for adjusting the control ring circumferentially of the ducting whereby the communication of the ducting with the cells is affected.

The orifices in the control ring may be so dimensioned and arranged that on adjustment of the control ring the timing of the opening and closing of the adjacent ends of the cells by the control ring and the associated ducting is altered relatively to the timing of the opening and closing of the remote ends of the cells. The orifices in the control ring may also be so dimensioned and arranged that on adjustment of the control ring the area of the ducting open to the cells is altered, thereby affecting the flow of gas through the cells.

The control ring may be adjustable manually or in response to an operating function of the pressure exchanger such as speed, pressure or temperature. There may be a control ring co-operating with the ducting at each end of the cell ring.

Figure 2:
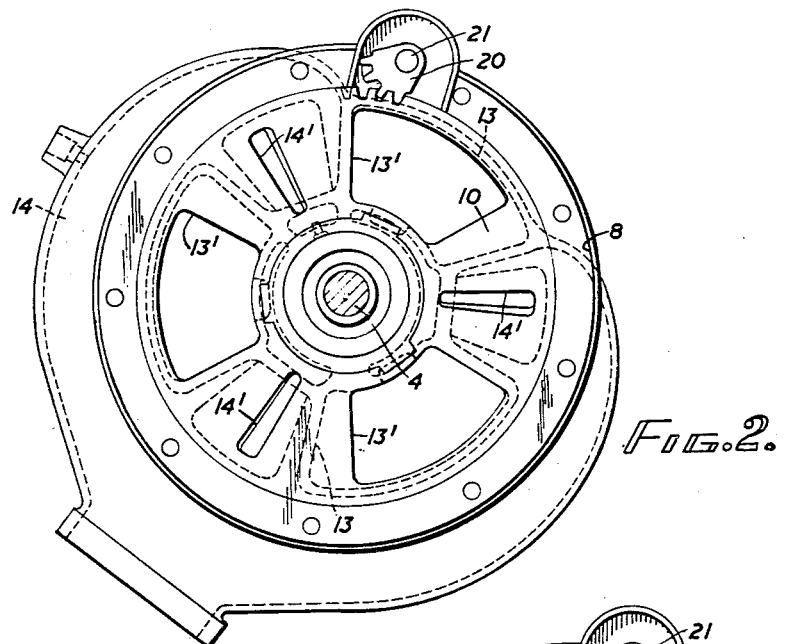
Figure 3:
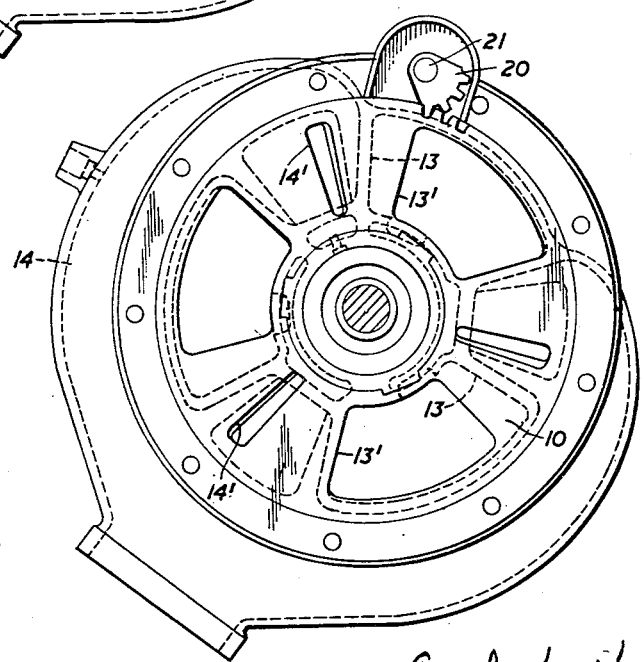
Figure 4:
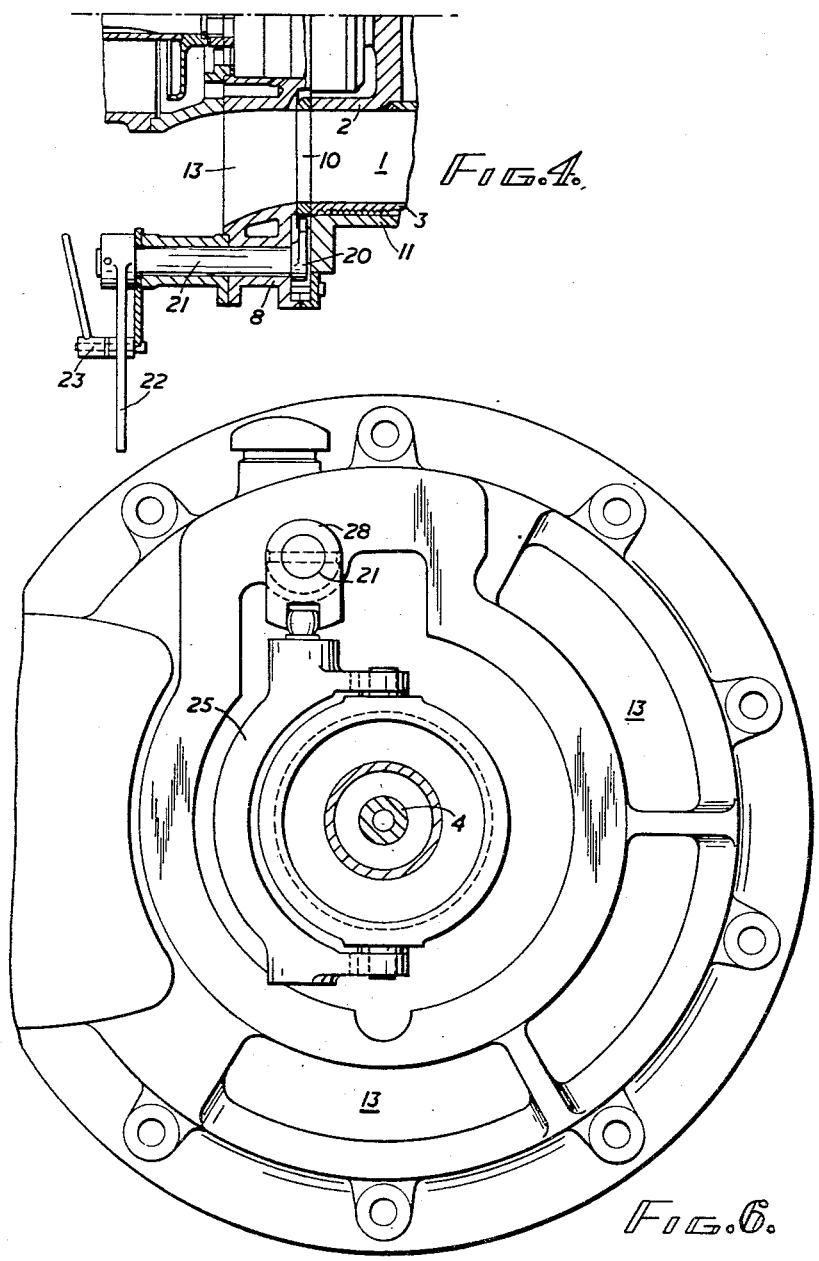
Figure 5:
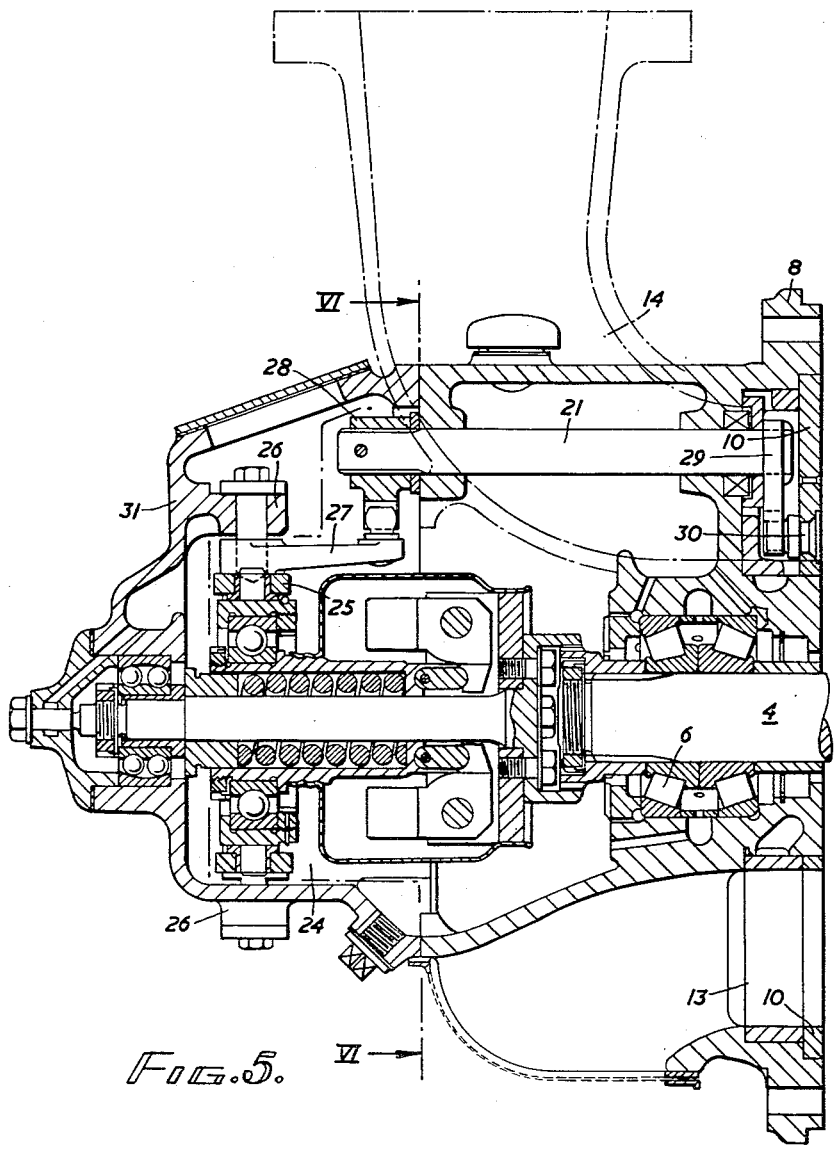
Figure 7:
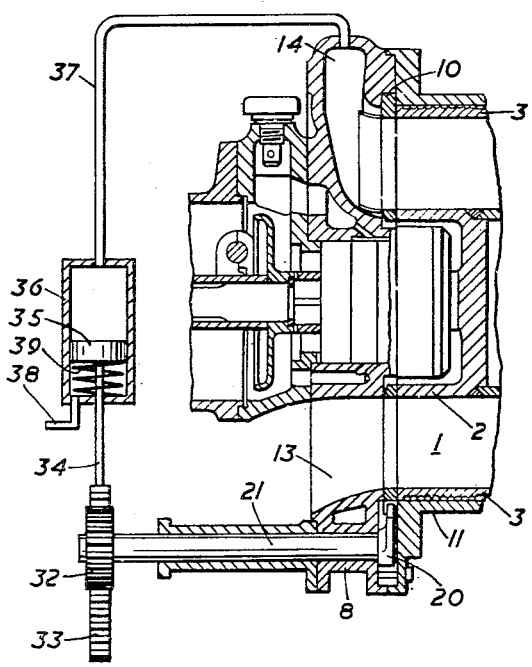

By way of example, embodiments of the invention will now be described with reference to the drawings, in which:

Figure 1 is a longitudinal section through a pressure exchanger according to a first embodiment, Figure 2 is a sectional view on the line II—II of Figure 1, showing the adjustable orifice plate 10 as hereinafter described in one extreme position, Figure 3 is a sectional view on the line II—II of Figure 1 showing the adjustable orifice plate 10 in the other extreme position, Figure 4 is a part of Figure 1 showing a manual control for operating the adjustable orifice plate 10, Figure 5 is a sectional view corresponding to a part of Figure 1 showing a speed governor control for the adjustable orifice plate 10 in a pressure exchanger according to a second embodiment, Figure 6 is a sectional view on the line VI—VI in Figure 5 with the end cover plate 30, as hereinafter described, removed, and Figure 7 is a view similar to Figure 4 but showing a pressure-operated control for the adjustable orifice plate 10 instead of a manual control.

The pressure exchanger shown in Figure 1 comprises a rotatable cell ring 1 comprising cylindrical inner and outer walls 2 and 3 respectively which together with radial partitions form the cells. The cell ring is carried on stub shafts 4 and 5 mounted in bearings 6 and is rotated by a belt drive on pulleys 7. The ends of the cells co-operate with end plates 8 and 9 containing inlet and outlet passages for the working fluid of the pressure exchanger. The end plates are connected to a stationary casing for the cell ring comprising telescopically nesting cylindrical walls 11 and 12 which are provided with seals where they co-operate with the outer cylindrical wall 3 of the cell rings. This pressure exchanger is intended for use as a supercharger for an internal combustion engine and the gas inlets and outlets in the end plates are therefore as follows. The end plate 8 contains a fresh air inlet 13 and a compressed air outlet 14 for the supercharging of air to the internal combustion engine. The outlet 14 is of scroll shape. The end plate 9 contains a passage 15 conveying exhaust gases from the internal combustion engine and a passage 16 discharging at a lower pressure exhaust gases to the atmosphere. Attached to the end plate 9 is a casting 17 to which the exhaust manifold of the internal combustion engine is connected and which provides an exhaust duct to atmosphere. Arrows 18 show the direction of flow of gases through the cell ring. It will be appreciated that the end plate 9 is considerably hotter than the end plate 8. In view of this the cell ring 9 contains cooling passages 19 through which water or other coolant is circulated. In accordance with the invention means have been provided for controlling the opening and closing of the cells to the passages in the end plate 8. These means comprise a control ring in the form of an orifice plate 10 having apertures 13' and 14' corresponding to openings to the passages 13 and 14 in the end plate. The adjustable orifice plate is rotated through a small angle by means of a toothed quadrant 20 which engages teeth on the periphery of the plate 10. The two extreme positions of the orifice plate are shown in Figure 2 and Figure 3 respectively. The quadrant 20 is mounted upon a shaft 21 which is rotated manually as hereinafter described with reference to Figure 4. The apertures 13', 14' at all times coincide with part of the openings to the passages 13 and 14. Therefore adjustment of the orifice plate 10 between the two extreme positions has no effect upon the area of flow through the apertures 13', 14'. There is, however, an effect on the timing of the opening of the cells to the passages 13 and 14 with respect to the opening of the cells to the passages 15 and 16. The operating mechanism for the quadrant 20 is shown in Figure 4 and comprises the shaft 21 which may be rotated through the small angle between the two extreme positions of the orifice plate by a handle 22. After adjustment the handle may be locked in position by the clamp 23.

In the embodiment just described with reference to Figures 1–4 the operating quadrant 20 is rotated manually, but this could be operated automatically in response to an operating condition, e. g. speed of rotation or pressure or temperature in a part of the pressure exchanger or the apparatus associated therewith, for example an internal combustion engine supercharged by the pressure exchanger.

In Figures 5 and 6 the variable orifice plate 10 is operated automatically in response to rotational speed of the cell ring. Figures 5 and 6 show a second embodiment of the pressure exchanger which is the same as the first embodiment fundamentally but differs in several small features. In Figure 5 the "cold end" end plate 8 is shown, and this as in Figure 1 has fresh air inlets 13 and compressed air outlets 14 which outlets may be connected to the induction manifold of an internal combustion engine to be supercharged by the pressure exchanger. In the end plate 8 there is the variable diaphragm plate 10. The cell ring shaft 4 carries a spring loaded governor 24 which on change of speed moves the ends of the limbs of a U-shaped member 25 in the axial direction. The U-shaped member 25 is mounted in pivots 26 and movement of the U-shaped member 25 in its pivots causes an arm 27 to pivot about an end thereof. Movement of the arm 27 in turn causes movement of a U-piece 28 which rotates the operating shaft 21 for the orifice plate 10. In this embodiment the shaft 21 carries a U-piece 29 instead of the quadrant 20 of Figure 1, the U-piece 29 engaging a pin 30 in the orifice plate 10. Thus with this mechanism variation of speed of the cell ring shaft 4 actuates the governor 24 and the variable orifice plate 10 is moved within the limits of the two extreme positions shown in Figures 2 and 3. The governor 24 and operating mechanism for the orifice plate 10 are contained within a housing 31 attached to the end plate 8.

In the two embodiments described the variable orifice plate 10 has been described only in co-operation with the cold end plate 8. An adjustable orifice plate could be provided in co-operation with the hot end plate 9, but this would have mechanical disadvantages due to the higher temperature and need for water cooling.

A brief description of a pressure exchanger having a variable orifice plate as shown in Figures 1–4 or 5 and 6 will now be given. As the cell ring rotates, fresh air is drawn in through the inlets 13, and is compressed in the cells. The compressed air is carried in the cells to openings 14, where it is discharged and conveyed to the internal combustion engine to be supercharged. In the meantime, at the other end of the cells, contaminated exhaust gas from the internal combustion engine enters the cells through passage 15 and is expanded in the cells and exhausted to atmosphere through passage 16. The compression and expansion processes in the cells are produced by shock waves and rarefaction in the cells due to the correct timing of the opening and closing of the ends of the cells by the end plates. It will be appreciated that for any particular speed of rotation or local speed of sound the relative timing between the two end plates is critical and this is the reason for the variable orifice plates 10. Rotation of the orifice plate either manually as in Figures 1–4 or automatically in response to rotational speed as in Figures 5 and 6 or automatically in response to other factors such as temperature and pressure produces the necessary adjustments of timing of the opening and closing of the cells to the end plates.

Figure 7 shows an arrangement by which the orifice plate 10 is moved circumferentially in response to pressure in the compressed air outlet 14. The mechanism includes the quadrant 20 and the shaft 21 arranged as shown in Figure 4; but for operation by a rack-and-pinion device instead of the operating handle 22. The rack-and-pinion device comprises a pinion 32, carried on the end of shaft 21 remote from the toothed quadrant 20, and a rack 33, engaged by the pinion 32. The rack is attached by a rod 34 to a piston 35, slidable in a cylinder 36. The cylinder is connected at the end wall remote from the rack 33 to the outlet 14 of the pressure exchanger by a pipe 37 and is open to the atmosphere through a pipe 38 in the end wall nearer to the rack 33. A spring 39 acts between the said nearer end wall of the cylinder and the piston 35. When the pressure in the outlet 14 rises sufficiently above atmospheric pressure to overcome the spring 39, the rack is moved downwards as viewed in Figure 7 and the shaft 21 and the quadrant are rotated, thereby operating the orifice plate. On reduction of pressure in the outlet 14, the piston moves upwardly and the orifice plate is turned in the reverse direction. The pipe 37 may be connected to a part of the pressure exchanger other than the outlet 14, where the orifice plate is required to be operated in response to another variable pressure. Where the pressure exchanger is associated with other apparatus e. g. an internal combustion engine supercharged by the pressure exchanger, the pipe 37 may be connected to a convenient part of that apparatus.

In the foregoing description the variable orifice plate 10 only produces variation in timing of opening and closing of the cells to the end plates. This is because the openings 13' and 14' in the variable orifice plate coincide with the openings in the end plate at all times. The apertures 13' and 14' could be made to subtend a larger angle at the center of rotation so that the apertures 13' and 14' coincide with the openings of the end plate in one position but are partly obscured or even fully obscured by the openings in the end plates in the other extreme position. In this way not only will the timing of opening and closing the cells be altered, but also the mass flow through the openings will be affected, and in the extreme case when the end plate openings are fully obscured the pressure exchanger would be shut down.

Another variation within the scope of the invention is the splitting of the orifice plate into two or more circumferentially spaced portions. Each portion could then be operated in response to a different operational condition, e. g. one portion to be operated in response to rotational speed while another portion is operated in response to pressure at a point in the pressure exchanger. With this arrangement both timing and the mass flow through the ports could be varied.

The embodiments described have stationary end plates and a rotatable cell ring. It is within the scope of the invention to keep the cell ring stationary and to rotate the end plates, the adjustable orifice plate being mounted on an end plate for rotation therewith.

The embodiments described have cells extending in a direction parallel with the axis of the cell ring. It is within the scope of the invention to employ instead radially extending cells. The ducting co-operating with the cells would be arranged at the radially inner and outer ends of the cells or at radially spaced positions co-operating with openings in the cell walls. Adjustable control rings would be provided between the cell openings and the ducting. As with the embodiments having cells extending parallel with the axis of the cell ring, the cell ring may be stationary and the ducting rotatable or vice versa.

What is claimed is:

1. A rotary pressure exchanger comprising a ring of cells for the compression and expansion of gas, ducting for leading gas to and from the cells, means for effecting relative rotation between the cells and the ducting, a ported annular plate positioned between the ducting and the cells at one end of the cells at least, said ported plate being movable circumferentially relatively to the ducting at the opposite end of the cells and means for circumferentially moving the ported plate.

2. A rotary pressure exchanger comprising a ring of cells for the compression and expansion of gas, ducting for leading gas to and from the cells, means for effecting relative rotation between the cells and the ducting, a control ring positioned between the cell ring and ends of the ducting adjacent an end of the cells, the control ring being adjustable circumferentially relatively to the ducting and having orifices therein which are so dimensioned and arranged in relation to the ducting ends that the latter are at least partly obscured by the control ring, and means for adjusting the control ring circumferentially of the ducting, whereby the communication of the ducting with the cells is affected.

3. A rotary pressure exchanger as claimed in claim 2 in which the orifices in the control ring are so dimensioned and arranged that on adjustment of the control ring the timing of the opening and closing of the adjacent ends of the cells by the control ring and the associated ducting is altered relatively to the timing of the opening and closing of the remote ends of the cells.

4. A rotary pressure exchanger as claimed in claim 2 in which the orifices in the control ring are so dimensioned and arranged that on adjustment of the control ring the area of the ducting open to the cells is altered, thereby affecting the flow of gas through the cells.

5. A rotary pressure exchanger comprising a rotatable ring of cells for the compression and expansion of gas, stationary ducting for leading gas to and from the cells, means for rotating the cell ring, a control ring positioned between the cell ring and ends of the ducting adjacent an end of the cells, the control ring being adjustable circumferentially relatively to the ducting and having orifices therein which are so dimensioned and arranged in relation to the ducting ends that the latter are at least partly obscured by the control ring, and means for adjusting the control ring circumferentially of the ducting, whereby the communication of the ducting with the cells is affected.

6. A rotary pressure exchanger comprising a ring of cells for the compression and expansion of gas, ducting for leading gas to and from the cells, means for effecting relative rotation between the cells and the ducting, a control ring positioned between the cell ring and ends of the ducting adjacent an end of the cells, the control ring being adjustable circumferentially relatively to the ducting and having orifices therein which are so dimensioned and arranged in relation to the ducting ends that the latter are at least partly obscured by the control ring, and manually operable means for adjusting the control ring circumferentially of the ducting, whereby the communication of the ducting with the cells is affected.

7. A rotary pressure exchanger comprising a ring of cells for the compression and expansion of gas, ducting for leading gas to and from the cells, means for effecting relative rotation between the cells and the ducting, a control ring positioned between the cell ring and ends of the ducting adjacent an end of the cells, the control ring being adjustable circumferentially relatively to the ducting and having orifices therein which are so dimensioned and arranged in relation to the ducting ends that the latter are at least partly obscured by the control ring, and means for adjusting the control ring circumferentially of the ducting, whereby the communication of the ducting with the cells is affected, said control ring adjusting means being responsive to an operational condition of the pressure exchanger.

8. A rotary pressure exchanger as claimed in claim 7 in which the control ring is adjustable in response to rotational speed of the pressure exchanger.

9. A rotary pressure exchanger as claimed in claim 7 in which the control ring is adjustable in response to pressure at a region of the pressure exchanger.

10. A rotary pressure exchanger comprising a ring of axially extending cells for the compression and expansion of gas, ported end plates positioned adjacent the cell ends, ducting communicating with ports in the end plates for leading gas to and from the cells, means for effecting relative rotation between the cells and the end plates, a control ring positioned between the cell ring and the end plate at one end of the cell ring, the control ring being adjustable circumferentially relatively to the adjacent end plate and having orifices therein which are so dimensioned and arranged in relation to the ports in the said adjacent end plate that the latter are at least partly obscured by the control ring, and means for adjusting the controlling circumferentially of the said adjacent end plate, whereby the communication of the ducting with the cells is affected.

11. A rotary pressure exchanger as claimed in claim 10 in which the control ring is in the form of an annular plate housed in a groove in the face adjacent the cells of an end plate.

12. A rotary pressure exchanger arranged as a supercharger for an internal combustion engine and comprising a rotatable cylindrical cell ring in which the cells extend between opposed end faces thereof, stationary end plates positioned adjacent the cell ends and containing passages through which gas is led to and from the cells in such a manner that one end plate, hereinafter referred to as the "cold" end plate, passes gas substantially colder than gas passing through the other end plate, driving means for rotating the cell ring, an annular orifice plate associated with the cold end plate and housed in a groove in the face thereof adjacent the cells, the orifice plate having orifices therein which are smaller than and coincide with the passage openings in the end plate, a mechanism for adjusting the orifice plate circumferentially in the groove in the end plate in response to a speed responsive governor on the shaft carrying the cell ring, the arrangement being that on change of rotational speed from a design value, the orifice plate is adjusted to change the timing of the opening and closing of the adjacent ends of the cells with respect to the remote ends of the cells.

References Cited in the file of this patent

UNITED STATES PATENTS

| 1,859,264 | Zoller | May 17, 1932 |
| 1,955,799 | Fielden | Apr. 24, 1934 |
| 2,067,757 | Fielden | Jan. 12, 1937 |
| 2,291,273 | Wydler | July 28, 1942 |
| 2,675,173 | Jendrassik | Apr. 13, 1954 |
| 2,687,843 | Alcock | Aug. 31, 1954 |
| 2,738,123 | Hussmann | Mar. 13, 1956 |

FOREIGN PATENTS

| 75,436 | Denmark | Feb. 16, 1953 |